United States Patent [19]

Howe et al.

[11] 4,222,070

[45] Sep. 9, 1980

[54] RECORDING VIDEO INFORMATION ON A FLEXIBLE MASTER DISC

[75] Inventors: Dennis G. Howe, Fairport; Harold T. Thomas, Rochester; James K. Lee, Rochester, all of N.Y.

[73] Assignee: Eastman Kodak Company, Rochester, N.Y.

[21] Appl. No.: 885,921

[22] Filed: Mar. 13, 1978

[51] Int. Cl.² .................. H04N 5/76; B32B 31/16
[52] U.S. Cl. .................. 358/128.5; 156/74; 274/39 R; 346/137
[58] Field of Search .................. 358/233, 128, 129; 360/99, 135; 179/100.3 V; 346/137; 274/39 R; 156/74; 355/76

[56] References Cited

U.S. PATENT DOCUMENTS

| | | | |
|---|---|---|---|
| 3,687,667 | 8/1972 | Hayakawa et al. | 96/35.1 |
| 3,729,720 | 4/1973 | Darling et al. | 360/99 |
| 3,737,880 | 6/1973 | Kelley | 360/99 |
| 3,805,292 | 4/1974 | Hashiguchi et al. | 360/135 |
| 3,825,323 | 7/1974 | Landwer | 358/129 |
| 3,922,086 | 11/1975 | Freericks | 156/74 X |
| 3,992,576 | 11/1976 | Sugiura | 179/100.3 V |
| 4,003,059 | 1/1977 | Sugiura et al. | 358/128 |

Primary Examiner—Stuart N. Hecker
Assistant Examiner—Donald McElheny, Jr.
Attorney, Agent, or Firm—Donald W. Strickland

[57] ABSTRACT

Video information is commonly recorded on a master record device such as a video disc by focussing a modulated recording beam on the master disc and rotating the disc relative to the focussed recording beam. During exposure, the recording beam travels across the rotating master disc so that a spiral track of video information is recorded. Because of the extremely small depth of focus, typically less than a micron, focus maintenance is simplified if the master disc recording surface is optically flat. This requirement has led to the use of a relatively expensive master video disc comprised of optically polished glass, quartz or other rigid material. In accordance with the present invention, a method of recording video information on a master disc is provided which permits the use of an inexpensive flexible master disc comprised of ESTAR or other similar material, and yet which enables an extremely small depth of focus to be accurately maintained.

7 Claims, 6 Drawing Figures

RECORDING VIDEO INFORMATION ON A FLEXIBLE MASTER DISC

CROSS-REFERENCE TO RELATED APPLICATIONS

U.S. patent application Ser. No. 885,922 filed Mar. 13, 1978 in the names of Harold T. Thomas, Dennis G. Howe, and James K. Lee.

BACKGROUND OF THE INVENTION

1. Field of the Invention

The present invention relates to a master disc and the recording of video information thereon. More particularly, the invention concerns such disc and such recording wherein the master disc is flexible.

2. Description Relative to the Prior Art

In order to record video information at a relatively high packing density, the video information is commonly recorded in the form of micron and sub-micron sized data bits such as pits, bumps, apertures, etc. Focussing a recording beam to such small dimensions calls for the use of a high numerical aperture optical system. Attendant with the use of a high numerical aperture optical system is an extremely small depth of focus. As an example, if the recorded video information is in the form of data bits as small as half a micron in size, the maximum allowable depth of focus can be as small as one-fourth of a micron, depending upon the wavelength of the recording beam. Maintaining this depth of focus is difficult even in a static system, i.e., one in which the optical system and record medium are not moving. The difficulty, as might be expected, is multiplied in a dynamic recording system wherein the record medium and/or the optical system are in motion.

In a typical video disc recording system, a twelve inch master disc spins at a high rate of speed, commonly 1800 rpm. During recording, a modulated recording beam scans the master disc so that billions of video data bits are recorded along a spiral track. All during this recording process the recording beam must be kept in proper focus, which means that the spinning disc surface must be kept within the depth of focus of the recording beam. As stated, the depth of focus for such a system is extremely small and it is very difficult to maintain proper focus.

U.S. Pat. No. 3,825,323 discloses a disc recording system wherein the disc has a surface coated with a conductive film. An electrode is mounted to the lens system which focusses the recording beam on the disc. The electrode and conductive film thus form a capacitor, the capacitance of which varies as a function of lens to disc spacing. The capacitance can thus be monitored to provide an indication of focus. A servomechanism adjusts the lens to disc spacing in response to the monitored capacitance to keep the recording beam in focus on the disc. Such a system apparently works best with a disc of glass, for example, which is optically ground and polished to a high degree of optical flatness. Some localized surface irregularities may not, however, be detected because the sensed capacitance of a perfectly flat disc can be identical to the sensed capacitance of a disc having several closely spaced surface depressions and humps which cancel each other from a capacitance standpoint, resulting in low quality recording on the disc due to focus error. Even if a small, localized surface irregularity were detected as a change in capacitance, the lens positioning adjustment may have to take place so fast that the required compensation is beyond the response time of the servomechanism, especially if the lens system is relatively heavy.

U.S. Pat. No. 4,006,294 discloses a recording head assembly which is spaced a nominal distance from a flexible video disc mounted to a turntable. The head assembly contains a lens system for focussing a recording beam (i.e., a laser) on the surface of the video disc. A small aperture is provided in the head assembly to direct an air stream toward the video disc. A change in the spacing between the head assembly and the disc causes a corresponding change in the back pressure of the air stream. The head assembly, by means of a pair of expandable chambers connected to each other by a fluid restrictor, senses the change in back pressure and automatically adjusts the height of the lens system from the disc surface to restore proper focus.

Another type of focus control device for use with video discs which utilizes air flow is disclosed in U.S. Pat. No. 4,003,059. In that patent, a lens system is mounted on a floating device provided with "floating shoes". As the video disc spins during recording, air flow between the spinning disc and the floating shoes produces a high enough air pressure on the shoes to float the floating device, and the lens system mounted thereto, at a constant height above the disc surface, thereby maintaining proper focus.

Both of the "air flow" type recording systems discussed above depend upon the video disc to provide a flat surface, preferably an optically flat surface, to float or locate against in order to define a focal plane. While the back pressure sensitive recording system of U.S. Pat. No. 4,006,294 is disclosed for use with a flexible video disc laying on top of a turntable, it is doubtful that such an arrangement would perform satisfactorily in those applications wherein it is required to record sub-micron sized data bits, where the depth of focus can be as small as a quarter micron. In particular, if the flexible disc is slightly stretched or warped it will not lay flat on the turntable, thus necessitating extensive and rapid focus adjustments of the lens system. In actual practice, the lens system may literally vibrate in an effort to maintain proper focus. As might be expected, such a condition is inherently unstable and can lead to unsatisfactory and non-uniform results. Further, even if the flexible video disc were perfectly flat, air pockets may be trapped under the disc when the disc is placed on the turntable, or even during the recording process itself. Any such air pockets may cause difficulties in focussing, such as those described above. Likewise, using a flexible video disc with the "floating head" recording system of U.S. Pat. No. 4,003,059 may lead to similar problems, especially when recording video data bits of sub-micron dimensions with a lens system having an extremely small depth of focus.

It is thus seen that while several recording systems are available for recording video information on a video disc at high packing densities, these systems generally require the use of a rigid, optically flat master disc. An optically flat video disc is expensive to manufacture, however, since a glass (or quartz, etc.) blank must be ground and polished to optical dimensions. As a practical matter, these expensive glass discs are easily damaged unless handled with great care. These problems are not insurmountable from a commercial standpoint when it is desired to mass produce replicate discs from a single master disc. The high initial cost of the master disc can be absorbed by allocating it over a large number of replicate discs. The situation is different, however, when no or only a few replicate discs are to be produced. Allocating the high cost of the master disc over a small number of replicate discs makes each replicate disc relatively expensive.

SUMMARY OF THE INVENTION

While prior art focussing devices for use in recording video information on a record device such as a video disc generally employ, and even require, an expensive rigid glass master disc which has been ground and polished to optical flatness, the present invention provides a method for recording video information in which prior art focussing devices can be used to record video information at high packing densities on a relatively inexpensive, flexible record device. In accordance with the invention, a flexible record device and a support device are superposed with a liquid layer therebetween and then spun. The support device, which need be manufactured only once and can be used with a large number of flexible record devices, has a surface configuration which defines a focal plane in which a recording beam is focussed. As an example, for the recording systems discussed above, the support device can be a glass platen having a surface ground and polished to optical flatness. In accordance with a presently preferred embodiment, a liquid, having properties described below, is deposited on the platen, after which the flexible record device is placed atop the platen with the liquid sandwiched between the platen and record devices. The record-support device combination is then so spun that the liquid between the record device and the support device spreads out to form a thin and uniform layer, thereby producing a vacuum effect which causes the flexible record device to accurately conform to the planar configuration of the support device. Video information is then recorded by exposing the flexible record device with a focussed recording beam. The focussing device, for example, can be one of the many prior art devices that work with a rigid master disc. After recording, the flexible record device is peeled from the support device to provide a relatively inexpensive master from which small numbers of replicates can be made at a cost which is competitive with mass produced replicates. Since the support device can be used over and over, the initial cost of its manufacture, which is about equal to the cost of a conventional master disc, can be allocated over many master discs.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Figure 1:
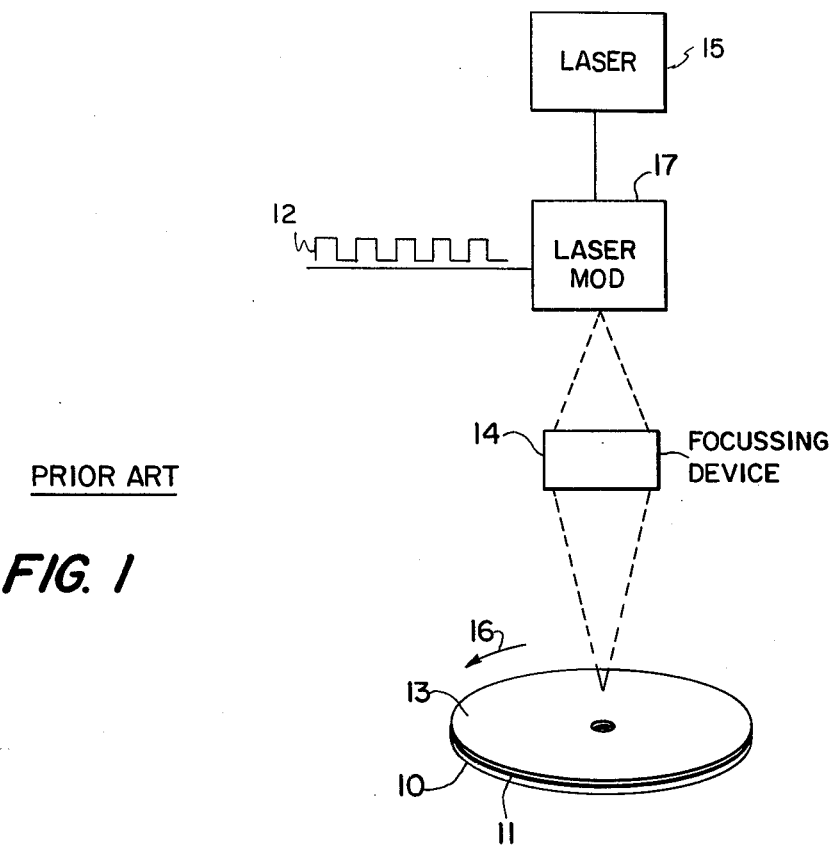
FIG. 1 illustrates a prior art recording device.

A prior art recording device of a type described above is shown in FIG. 1. A master disc 9 comprises a rigid glass disc 10 which has a surface 11 ground and polished to optical flatness. The optically flat surface 11 is coated with a recording sensitive material 13 such as a thin metal film (in the case of laser machining), a photoresist layer, etc. A signal 12, which may contain information in the form of FM encoded or pulse width modulated video, etc., is applied to a laser modulator 15 which modulates a recording beam from a laser 17 with the encoded video information. A focussing device 14 focusses the modulated recording beam onto the recording sensitive surface 13 of the disc 10. The focussing device 14 may take various forms known in the art such as a capacitance sensitive focussing device (U.S. Pat. No. 3,825,323), or a type of "air flow" device (U.S. Pat. Nos. 4,003,059 and 4,006,294). During recording, the master disc 9 spins in the direction of arrow 16 and the focussing device 14 travels relative to the disc 9 so that information is recorded on the disc 9 along a spiral track. As stated above, because the information is recorded in data bits of sub-micron dimensions, the focussing device 14 generally includes an optical system having a high numerical aperture. The use of high numerical aperture optics in the recording system leads to an extremely small depth of focus which can be as small as one quarter of a micron.

Figure 2:
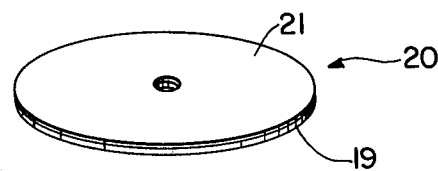
FIG. 2 shows a flexible video disc for use in accordance with the present invention.

It would be highly advantageous to eliminate the costly rigid master disc 9 and replace it with a master disc of less expensive construction, i.e., one not requiring grinding and polishing to optical flatness. For example, a record device in the form of a flexible disc 20 shown in FIG. 2 has several advantages over the rigid glass master disc 9. The support 19 of the flexible disc 20 can be manufactured from a relatively inexpensive material such as ESTAR (polyethylene terephthalate) and does not have to be optically ground and polished. A surface of the flexible disc 20 need only be coated with a recording sensitive material 21 suited to the method of recording employed. Because the flexible disc 20 is relatively inexpensive, it can serve as a master disc in the manufacture of relatively small numbers of replicates. Further, because the flexible disc 20 is not breakable it can be easily handled during the manufacturing process.

A problem in using the flexible disc 20 as a master upon which information is to be recorded is one of maintaining the sensitive surface 21 of the flexible disc 20 precisely in the focal plane of the focussing device. This problem is particularly acute when the depth of focus is in the sub-micron range. It is known that flexible optical video discs can be aero-dynamically flown on an air cushion and locally (in the vicinity of the read out objective) hydrodynamically stabilized for purposes of playback. The playback optics of such systems, however, employs a relatively small numerical aperture lens system and thus enjoys a larger depth of focus, generally on the order of two to five microns. A flexible disc can be flown and locally stabilized such that its image bearing surface remains in the focal plane when the depth of focus is about two microns. But when dealing with optical systems having a depth of focus in the sub-micron range, aerodynamically flying and locally stabilizing the flexible disc does not appear to be a workable alternative, at least not with present systems.

In accordance with the present invention, a method of recording information on a flexible disc is provided which is suitable for use with optical systems having an extremely small, i.e., sub-micron, depth of focus. According to the invention, a support device such as a glass platen is employed which has a surface configuration which defines the focal plane of the recording system. For example, in the prior art recording system discussed above and illustrated in FIG. 1, the support device (support device 10) may be a glass platen which has one surface which has been ground and polished to optical flatness. While the cost of manufacturing such a glass platen is generally about the same as the cost of manufacturing a rigid glass master disc substrate, the present invention provides a method wherein the same glass platen can be repeatedly used in the manufacture of numerous flexible master discs each of which is relatively inexpensive. Repeated use of the glass platen allows the initial cost of the platen to be allocated over many master discs.

Figure 3A:
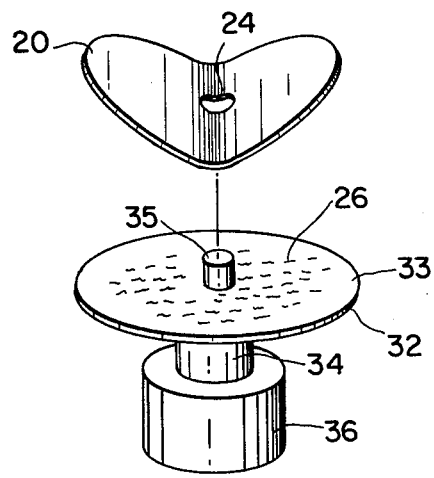
FIGS. 3a, 3b and 3c illustrate a method in accordance with the present invention.
Figure 3B:
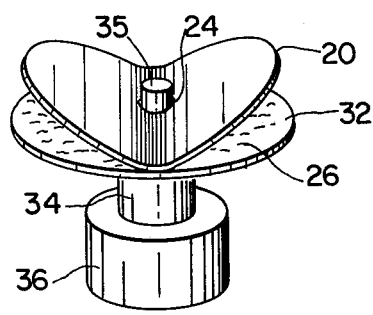

Referring to FIGS. 3a and 3b, a support device in the form of a glass platen 32 having an upper surface 33 ground and polished to optical flatness is mounted on a shaft 34 which is connected to a motor 36. A liquid 26 is applied to the surface 33 of the glass platen 32. In this example, the liquid 26 is Fluorinert (by 3M Company), although numerous other types of liquids are suitable, as discussed more fully below. A master record device in the form of a flexible disc 20 is supported (by hand, for example) at diametrically opposed edge points. Because the disc 20 is flexible, the center portion sags below the supported edges. The flexible disc 20 is then lowered into contact with the glass platen 32, a registration pin 35 fitting through a hole 24 of the disc 20 to properly align the flexible disc 20 on the glass platen 32. As shown in FIG. 3b, the flexible disc 20 first contacts the fluid 26 along a diameter roughly perpendicular to that on which the support points lie. As the support points are lowered further, the liquid 26 which is sandwiched between the flexible disc 20 and the glass platen 32 produces a vacuum effect which holds the disc 20 and platen 32 together, thus forming a record-support device combination. Alternatively, the liquid can be applied to the flexible disc 20, or to both the flexible disc 20 and the glass platen 32. The above method of forming a record-support device combination is advantageous because few, if any, bubbles are trapped in the liquid 26 beween the record device (flexible disc 20) and the support device (glass platen 32).

Figure 3C:
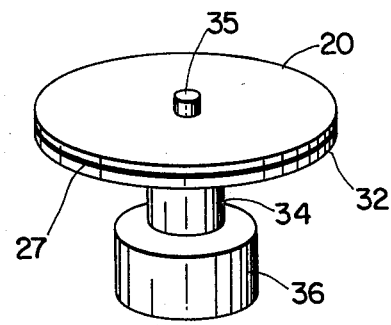

The record-support device combination is now spun about an axis substantially perpendicular to the planar surface of the support device 32 at a rate of about 1,000 to 2,000 rpm for approximately one minute. The centrifugal force acting on the liquid 26 causes most of the liquid to be flung out from around the edge of the sandwiched record and support devices. Only a very thin liquid layer 27 (see FIG. 3c) remains sandwiched between the flexible disc 20 and the glass platen 32. A vacuum action is thus produced which causes the disc 20 and platen 32 to be tightly pressed together, thereby achieving close contact over the entire surface. The rate at which the record-support device combination is spun and the duration of spinning determines the final thickness and uniformity of the liquid layer 27 for a given liquid. It has been found that the above spin parameters result in a liquid layer of Fluorinert which is extremely thin and highly uniform, and which is believed to have a thickness on the order of 100° A. Since the glass platen 32 is polished to a high degree of flatness and the layer of liquid 27 is highly uniform, the flexible disc 20 assumes a highly planar configuration having a flatness approaching that of the glass platen 32.

Figure 4:
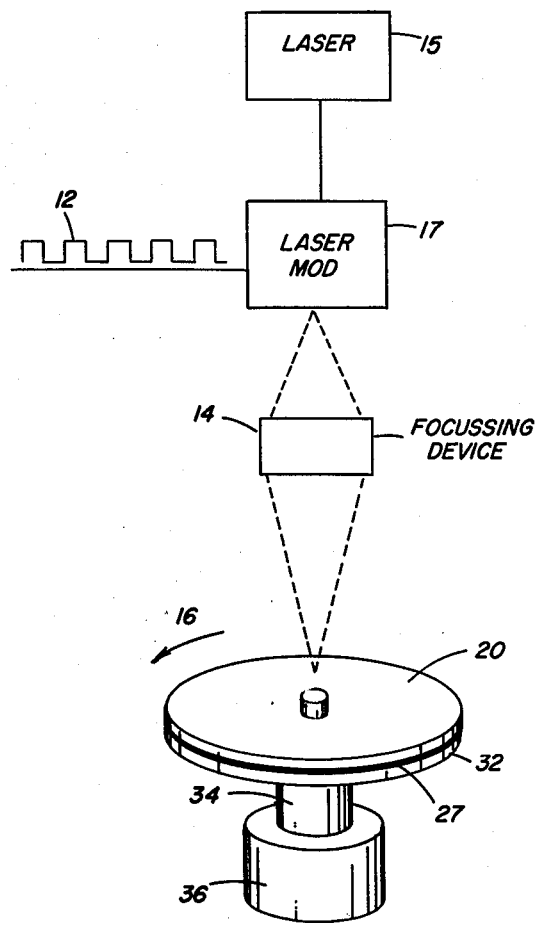
FIG. 4 shows how information is recorded on a flexible record device in accordance with the present invention.

The disc-support device combination can now be used with known recording systems as shown in FIG. 4.

The focussing device 14 is adjusted to be focussed in the plane of the recording sensitive surface of the flexible disc 20. Since the flexible disc 20 accurately conforms to the surface configuration of the rigid glass platen 32, the record sensitive surface is optically flat (providing the ESTAR is uniformly thick). The sensitive surface of the flexible disc 20 can thus be kept in the focal plane of the focussing device 14, even though the depth of focus may be as small as one quarter of a micron, because it is now rigid so that one can float or locate against it. The support device in the form of the glass platen 32 is rotated, with the flexible record disc 20 adhered thereto, by the motor 36 (via shaft 34 which is coupled to platen 32 by means not shown). Recording of the information takes place as described above in connection with FIG. 1. After recording of the information, the flexible disc 20 is merely peeled from the glass platen 32 and forms a master from which replicates are produced. The glass platen 32 is cleaned and reused. Reusing the glass platen 32 obviates the necessity for grinding a glass surface to optical flatness every time a master recording is to be made, thereby significantly reducing the cost of manufacturing a master disc. The present invention thus provides a method for producing inexpensive masters, thereby enabling even small quantities of replicates to be economically produced.

It is thus seen that close contact between a flexible master record device and a support device can be obtained by (1) applying liquid to the support device (or the record device or both devices), (2) placing the record device in contact with the support device, and (3) spinning the record-support device combination. Liquid is forced from between the sandwiched devices under the influence of centrifugal force, leaving between the record and support devices a very thin, highly uniform layer of liquid.

For optimum results, the liquid should have certain properties. First, it should be clean and generally free of particle contaminants. Due to the extremely thin layer of liquid remaining between the flexible record device and the support device, any particles which contaminate the liquid will give rise to an abrupt spacing change between the discs, thereby adversely affecting the flatness of the master's sensitive surface.

Another desirable property of the liquid is that it wets the surfaces of the record device and the support device with which it comes in contact. By "wetting" the surface it is meant that the liquid uniformly covers the surface and does not bead or leave open areas of the surface exposed. In addition to wetting the surface, the liquid should preferably be inert with respect to the surfaces with which it comes in contact. Otherwise, the record device or the support device may be damaged.

It is also convenient to use a liquid which has a low vapor pressure so it will not evaporate before the mastering process is completed. For those applications, however, where the mastering process occurs soon after adherence of the record device to the support device, the vapor pressure is not particularly critical. Also, since evaporation of the liquid first occurs at the edges of the sandwiched devices, the vapor pressure of the liquid is not as important if the recording is confined to the inner regions of the record device.

While the above discussion regarding the properties of liquids useful in the practice of the invention is sufficient to enable one skilled in the art to select a liquid or liquids suitable for a particular application, it is convenient to consider some specific examples of liquids which have been found to give good results, at least for some applications: Fluorinert (inert, low viscosity, low vapor pressure, manufactured by 3M Company); Aroclor 1254 (Monsanto Chemical Co.); 1,1,2,2-tetrabromoethane; Series A index of refraction liquid 1.64 (R. P. Cargille Labs, Inc.); Benzene (inert to Bi), Toluene (inert to Bi); Xylene (inert to Bi); Chlorobenzene (inert to Bi); and water with a surfactant added (inert to thermoplastic recording materials).

The thickness of the liquid layer between the master disc and the rigid glass platen can be controlled somewhat by properly selecting the viscosity of the liquid, spin speed and duration of spin. The thickest coatings are obtained for a high viscosity liquid, a relatively slow spin speed and short spin duration. The spin speed and duration cannot, however, be made arbitrarily low because the uniformity of the remaining liquid layer may be affected.

There are many modifications which can be made to the above-described method. For example, the support device (glass platen 32) was assumed to have an optically flat surface. The flatness of the support device apparently affects the uniformity of the liquid layer 27 between the support device and the record device (flexible disc 20). Adhering a flexible record device to a "bumpy" support device causes a flexible record device to be bumpy as well. For some applications, i.e., where only low packing density (large recorded data spots) is of interest, the depth of focus is not as critical and nonflatness of the record device can be tolerated to some extent. For applications wherein it is desired to master micron or sub-micron sized dots, the depth of focus is critical and any deviation from optical flatness of the flexible record device will adversely affect the mastering operation. Thus, the surface quality of the support device should be chosen according to the particular application.

The invention has been described in detail with particular reference to preferred embodiments thereof, but it will be understood that variations and modifications can be effected within the spirit and scope of the invention. For example, while the particular record device and support device discussed above were disc shaped, the present invention may be used in connection with irregular shapes as well. For example, the record device and the support device could be rectangularly shaped rather than disc shaped. The support device may even be larger than the flexible disc.

What is claimed is:

1. A method of recording information on a flexible record device comprising the steps of:
    forming a record-support device combination by superposing the flexible record device and an optically flat rigid support device with a liquid therebetween;
    spinning the record-support device combination to obtain a layer of liquid less than about 500 angstroms in thickness between the record and support devices causing the flexible record device to conform to the surface configuration of the rigid support device; and
    exposing the record device, while superposed on said support device, with a recording beam to record information on the record device.

2. A method of recording video information on a flexible record device, said method for use with a support device having an optically flat surface configuration which defines a reference focal plane in which a recording beam may be focussed, said method comprising the steps of:
    applying a liquid to either or both of said record or support devices;
    superposing the record and support devices to form a record-support device combination having said liquid between the record device and the support device;
    spinning the record-support device combination to cause the liquid to form a thin layer less than 500 angstroms in thickness between the record and support devices; and
    focussing a recording beam on the record device, while superposed on said support device, to record video information thereon.

3. A method of recording video information on a flexible record device of a type which may assume a generally planar configuration, said method for use with a support device having an optically flat planar surface, said method comprising the steps of:
    forming a record-support device combination by superposing the record and support devices so that a liquid resides between said record device and the planar surface of said support device;
    spinning the record-support device combination about an axis substantially perpendicular to the planar surface of said support device to obtain a uniform layer of liquid less than about 500 angstroms in thickness between the record and support devices causing the flexible record device to assume a generally planar configuration; and
    focussing a recording beam on the record device and exposing the record device, while in combination with the support device, with the focussed recording beam to record video information on the record device.

4. A method of recording video information on a flexible record disc, said method for use with a support device having an optically flat planar surface, said method comprising the steps of:
    applying a liquid to the planar surface of said support device, or to said record disc, or to both said support device and said record disc;
    superposing the record disc and support device to form a disc-support device combination having said liquid between the record disc and the planar surface of said support device;
    spinning the disc-support device combination to cause the liquid to form a uniform layer of liquid less than about 100 angstroms in thickness between the generally planar surface of the support device and the record disc, the flexible record disc thus assuming a generally planar configuration; and
    focussing a recording beam on the record disc and exposing the record disc, while superposed on said support device, with the focussed recording beam to record video information on the record disc.

5. A method of recording video information on a flexible record disc, said method for use with a support having an optically flat planar surface, said method comprising the steps of:
    forming a disc-support-liquid combination comprising said disc superposed on said planar surface of said support with said liquid therebetween;
    spinning the disc-support-liquid combination to obtain a uniform layer of liquid less than about 100 angstroms in thickness between the disc and support causing the flexible disc to assume a generally planar configuration;

focussing a recording beam on the record disc;

relatively rotating the disc-support-liquid combination with respect to the recording beam while keeping the recording beam in focus on the record disc; and exposing the record disc, while superposed on said support, with the focussed recording beam to record video information on the record disc.

6. A method for forming a flexible video record disc comprising the steps of:

superposing a record disc on an optically flat surface of a support device with a liquid therebetween;

spinning the support device about an axis generally perpendicular to said flat surface thereby causing the liquid to form a uniform layer of liquid less than about 100 angstroms in thickness between the generally planar surface of the support device and the record disc, the flexible record disc thus assuming a planar configuration;

focussing a recording beam on the record disc;

rotating the support device, with the record disc adhered thereto, relative to the recording beam; and exposing the record disc while adhered to said support device with the focussed recording beam to record video information on the record disc, and peeling said record disc from said support device.

7. A flexible video disc record made by the method of:

superposing a record disc on an optically flat surface of a support device with a liquid therebetween;

spinning the support device about an axis generally perpendicular to said flat surface thereby causing the liquid to form a uniform layer of liquid less than about 100 angstroms in thickness between the generally planar surface of the support device and the record disc, the flexible record disc thus assuming a generally planar configuration;

focussing a recording beam on the record disc;

rotating the support device, with the record disc adhered thereto, relative to the recording beam; and exposing the record disc while adhered to said support device with the focussed recording beam to record video information on the record disc, and peeling said record disc from said support device.

* * * * *

UNITED STATES PATENT AND TRADEMARK OFFICE
CERTIFICATE OF CORRECTION

PATENT NO. : 4,222,070
DATED : September 9, 1980
INVENTOR(S) : Dennis G. Howe and Harold T. Thomas It is certified that error appears in the above-identified patent and that said Letters Patent are hereby corrected as shown below:

Column 8, line 10, before "500", insert --about--.

Signed and Sealed this

Twenty-fifth Day of November 1980

[SEAL]

Attest:

SIDNEY A. DIAMOND

Attesting Officer    Commissioner of Patents and Trademarks